US012353708B2

United States Patent
Ye

(10) Patent No.: US 12,353,708 B2
(45) Date of Patent: Jul. 8, 2025

(54) DISPLAY METHOD, TERMINAL DEVICE AND NON-TRANSITORY STORAGE MEDIUM

(71) Applicant: GUANGDONG OPPO MOBILE TELECOMMUNICATIONS CORP., LTD., Guangdong (CN)

(72) Inventor: Qiuqiang Ye, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 41 days.

(21) Appl. No.: 18/454,653

(22) Filed: Aug. 23, 2023

(65) Prior Publication Data
US 2023/0409195 A1    Dec. 21, 2023

Related U.S. Application Data

(63) Continuation of application No. PCT/CN2022/073261, filed on Jan. 21, 2022.

(30) Foreign Application Priority Data

Mar. 3, 2021 (CN) .......................... 202110236181.8

(51) Int. Cl.
*G06F 17/00* (2019.01)
*G06F 3/04886* (2022.01)
(Continued)

(52) U.S. Cl.
CPC ............ *G06F 3/04886* (2013.01); *G06T 3/40* (2013.01); *H04N 21/4788* (2013.01)

(58) Field of Classification Search
CPC ....... G06F 3/04886; G06F 2203/04803; G06T 3/40; H04N 21/4788; H04N 21/4858; H04N 21/4312
See application file for complete search history.

(56) References Cited

U.S. PATENT DOCUMENTS 10,466,897 B2 * 11/2019 Park ....................... G06F 40/166
10,866,651 B1 * 12/2020 Maalouf ............... G06F 1/1626
(Continued)

FOREIGN PATENT DOCUMENTS

CN    107678667 A  *  2/2018  ......... G06F 3/04886
CN    109600659 A  *  4/2019  ........... G06F 1/1641
(Continued)

OTHER PUBLICATIONS

CN109600659A, English translation, Li et al, published Apr. 9, 2019, pp. 1-16. (Year: 2019).*
(Continued)

Primary Examiner — Laurie A Ries
(74) Attorney, Agent, or Firm — Ladas & Parry, LLP

(57) ABSTRACT

The present application relates to a display method, a terminal device, and a non-transitory storage medium. The display method includes: in response to a video being played while waking-up of a virtual keyboard being detected, at least dividing a display region of a display screen into a first region and a second region, wherein the first region does not overlap with the second region; and playing the video in the first region, and loading the virtual keyboard into the second region.

16 Claims, 5 Drawing Sheets

(51) Int. Cl.
      *G06T 3/40*      (2006.01)
      *H04N 21/4788*   (2011.01)

(56) References Cited

U.S. PATENT DOCUMENTS

| | | | | |
|---|---|---|---|---|
| 11,809,702 B2* | 11/2023 | Klein | .................... | G06F 1/1692 |
| 2010/0321323 A1* | 12/2010 | Kim | ........................ | G06F 3/045 |
| | | | | 715/810 |
| 2013/0007663 A1* | 1/2013 | Piippo | .................. | G06F 3/0482 |
| | | | | 715/841 |
| 2015/0358584 A1* | 12/2015 | Mattson | ............... | G06Q 10/101 |
| | | | | 348/14.08 |
| 2017/0097689 A1* | 4/2017 | Miller | .................... | G06F 1/1624 |
| 2017/0308271 A1* | 10/2017 | Li | ........................ | G06F 3/04883 |
| 2019/0107943 A1* | 4/2019 | Daioku | ................. | G06F 3/0482 |
| 2020/0195877 A1* | 6/2020 | Li | ........................ | G06F 3/04812 |

FOREIGN PATENT DOCUMENTS

| | | | | | |
|---|---|---|---|---|---|
| CN | 110493651 A | | 11/2019 | | |
| CN | 111081156 A | * | 4/2020 | ............... | G09F 9/33 |
| CN | 111338555 A | | 6/2020 | | |
| CN | 111601141 A | | 8/2020 | | |
| CN | 111669459 A | | 9/2020 | | |
| CN | 111857532 A | | 10/2020 | | |
| CN | 112416238 A | | 2/2021 | | |
| EP | 3182245 A1 | | 6/2017 | | |
| WO | WO-2010110550 A1 | * | 9/2010 | ........... | G06F 3/0486 |
| WO | 2022183869 A1 | | 9/2022 | | |

OTHER PUBLICATIONS

CN107678667A, English translation, Zhang et al., published Feb. 9, 2018, pp. 1-18 (Year: 2018).*

CN111081156A, English translation, Cao et al., published Apr. 28, 2020, pp. 1-8 (Year: 2020).*

Chinese Rejection decision for the corresponding CN Application No. 202110236181.8, mailed Oct. 20, 2023 (13 pages).

Chinese First Office Action and search report from the corresponding Chinese Application No. 202110236181.8, mailed Jan. 5, 2023.

Chinese second Office Action from the corresponding Chinese Application No. 202110236181.8, mailed Jun. 24, 2023.

International Search Report, International Application No. PCT/CN2022/073261, mailed Apr. 12, 2022.

Written Opinion of the International Searching Authority in International Application No. PCT/CN2022/073261 mailed Apr. 12, 2022 with machine English translation provided by foreign counsel and by WIPO.

Chinese Notification of Reexamination for Chinese Patent Application No. 202110236181.8 issued on Aug. 14, 2024.

European Search Report for European Patent Application No. 22762337.8 issued on Aug. 29, 2024.

Chinese Notification of Reexamination for Chinese Patent Application No. 202110236181.8 issued on Oct. 16, 2024.

Chinese Review Decision Letter, from corresponding Chinese Patent Application No. 202110236181.8, mailed Dec. 27, 2024 (27 pages).

* cited by examiner

DISPLAY METHOD, TERMINAL DEVICE AND NON-TRANSITORY STORAGE MEDIUM

CROSS REFERENCE TO RELATED APPLICATIONS

The present application is a continuation of International Patent Application No. PCT/CN2022/073261, filed Jan. 21, 2022, which claims priority to Chinese Patent Application No. 202110236181.8, filed Mar. 3, 2021, both of which are herein incorporated by reference in their entireties.

TECHNICAL FIELD

The present application relates to the field of video playing in the communication field, and in particular to a display method, a terminal device and a non-transitory storage medium.

BACKGROUND

In the related art, when a user watches a video through a terminal device such as a cell phone, the user may click on or tap on a preset input box to wake up a virtual keyboard, and input a comment message in the preset input box via the virtual keyboard. When the user triggers the cell phone to send the comment message, the comment message is displayed in the form of bullet chat message on the video playing interface. The video picture would be occluded or shielded by the virtual keyboard while the user is inputting the comment message.

SUMMARY OF THE DISCLOSURE

A display method is provided in some embodiments of the present application. The display method includes: dividing, in response to a video being played while waking-up of a virtual keyboard being detected, a display region of a display screen at least into a first region and a second region, the first region and the second region being not overlapped with each other; and playing the video in the first region, and loading the virtual keyboard into the second region.

A terminal device is provided in some embodiments of the present application. The terminal device includes a processor and a memory. The memory is configured to store a computer program capable of running on the processor. The processor is configured to perform, in response to running the computer program, operations of the display method. The display method includes: dividing, in response to a video being played while waking-up of a virtual keyboard being detected, a display region of a display screen at least into a first region and a second region, the first region and the second region being not overlapped with each other; and playing the video in the first region, and loading the virtual keyboard into the second region.

A non-transitory storage medium is further provided in some embodiments of the present application. The storage medium stores a computer program. The computer program, when being executed by a processor, is configured to implement operations of the display method. The display method includes: dividing, in response to a video being played while waking-up of a virtual keyboard being detected, a display region of a display screen at least into a first region and a second region, the first region and the second region being not overlapped with each other; and playing the video in the first region, and loading the virtual keyboard into the second region.

DETAILED DESCRIPTION

Figure 1:
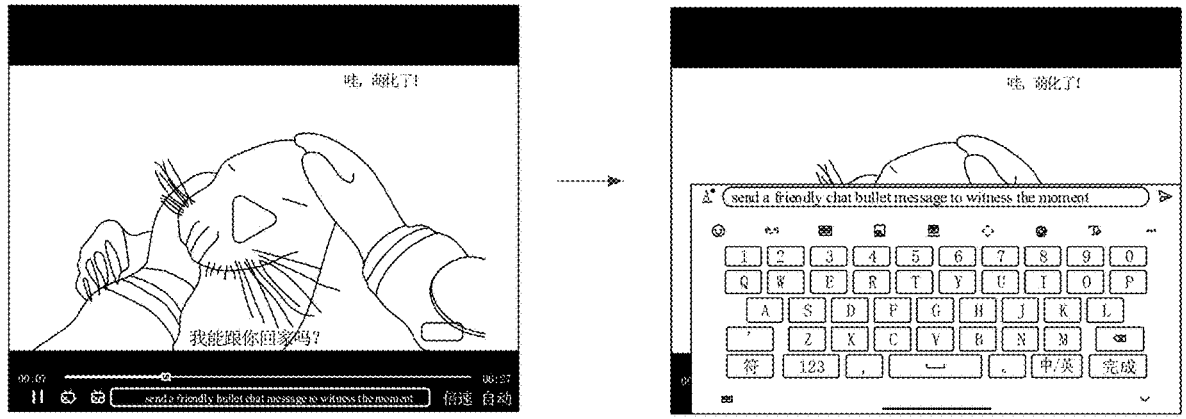
FIG. 1 is a schematic diagram of a video playing interface provided in the related art.

As illustrated in FIG. 1, in related art, when a user wakes up a virtual keyboard of a video playing terminal device during a process of watching a video, the virtual keyboard is superimposed over the video picture for being displayed, resulting that the virtual keyboard occludes the video picture.

To solve the above-mentioned technical problem, a display method is provided in the embodiments of the present disclosure. The display method includes: dividing, in response to the video being played while the waking-up of the virtual keyboard being detected, the display region of the display screen is at least divided into a first region and a second region, the first region and the second region being not overlapped with each other; playing the video in the first region, and loading the virtual keyboard into the second region. In this way, the virtual keyboard may be prevented from being superimposed over the video picture for being displayed, and the displayed virtual keyboard is prevented from occluding the video picture.

In a technical scheme, the operation of dividing the display region of the display screen at least into the first region and the second region includes: dividing, based on a first aspect ratio of the video and a second aspect ratio of the display screen, the display region at least into the first region and the second region in a first direction. The first direction represents the length direction or the width direction of the display screen.

In a technical scheme, the operation of dividing, based on the first aspect ratio of the video and the second aspect ratio of the display screen, the display region at least into the first region and the second region in the first direction includes: dividing, in response to the first aspect ratio being less than the second aspect ratio, the display region at least into the first region and the second region in the length direction of the display screen; or dividing, in response to the first aspect ratio being greater than or equal to the second aspect ratio, the display region at least into the first region and the second region in the width direction of the display screen.

In a technical scheme, the operation of dividing the display region at least into the first region and the second region in the first direction further includes: determining, based on a first size of the virtual keyboard and a second size of the video, a size of the first region in the first direction and a size of the second region in the first direction. The first size represents a corresponding size of the virtual keyboard in the first direction, and the second size represents a corresponding size of the video in the first direction.

In a technical scheme, the operation of determining, based on the first size of the virtual keyboard and the second size of the video, the size of the first region in the first direction and the size of the second region in the first direction further includes: in response to a first sum being less than or equal to a third size of the display region in the first direction, determining, based on the second size, the size of the first region in the first direction and the size of the second region in the first direction; or in response to the first sum being greater than the third size, determining, a minimum size supported by the virtual keyboard in the first direction, as the size of the second region in the first direction. The first sum represents a sum of the second size of the video and the minimum size supported by the virtual keyboard in the first direction.

In a technical scheme, in response to the first sum being greater than the third size, the operation of playing the video in the first region includes: in response to zooming or scaling of a picture of the video, playing the video in the first region.

In a technical scheme, the method further includes: receiving a bullet chat message relating to the video, the bullet chat message being input via the loaded virtual keyboard.

In a technical scheme, the operation of dividing the display region of the display screen at least into the first region and the second region includes: dividing, in response to the display screen meeting a set condition, the display region of the display screen into the first region, the second region and a third region. The third region is configured to display contents other than the video and the virtual keyboard.

In a technical scheme, the set condition includes: the display screen of the dual-screen foldable terminal device being in an unfolded state.

In a technical scheme, the third region is configured to display the bullet chat message corresponding to the video.

A terminal device is provided in some embodiments of the present application. The terminal device includes a splitting unit and a displaying unit. The splitting unit is configured to: divide, in response to the video being played while waking-up of the virtual keyboard being detected, the display region of the display screen at least into the first region and the second region. The first region and the second region are not overlapped with each other. The displaying unit is configured to: play the video in the first region, and load the virtual keyboard into the second region.

In a technical scheme, the splitting unit is configured to: divide, based on the first aspect ratio of the video and the second aspect ratio of the display screen, the display region at least into the first region and the second region in the first direction. The first direction represents the length direction or the width direction of the display screen.

In a technical scheme, the splitting unit is configured to: divide, in response to the first aspect ratio being less than the second aspect ratio, the display region at least into the first region and the second region in the length direction of the display screen; or dividing, in response to the first aspect ratio being greater than or equal to the second aspect ratio, the display region at least into the first region and the second region in the width direction of the display screen.

In a technical scheme, the terminal device further includes a determining unit. The determining unit is configured to: determine, based on the first size of the virtual keyboard and the second size of the video, the size of the first region in the first direction and the size of the second region in the first direction. The first size represents the corresponding size of the virtual keyboard in the first direction, and the second size represents the corresponding size of the video in the first direction.

In a technical scheme, the determining unit is further configured to: in response to the first sum being less than or equal to the third size of the display region in the first direction, determine, based on the second size, the size of the first region in the first direction and the size of the second region in the first direction; or determine, in response to the first sum being greater than the third size, the minimum size supported by the virtual keyboard in the first direction as the size of the second region in the first direction. The first sum represents a sum of the second size and the minimum size supported by the virtual keyboard in the first direction.

In a technical scheme, the terminal device further includes a receiving unit. The receiving unit is configured to: receive the bullet chat message relating to the video. The bullet chat message is input via the loaded virtual keyboard.

In a technical scheme, the splitting unit is configured to: divide, in response to the display screen meeting a set condition, the display region of the display screen into the first region, the second region and the third region. The third region is configured to display contents other than the video and the virtual keyboard.

In a technical scheme, the set condition includes: the display screen of the dual-screen foldable terminal device being in the unfolded state.

A terminal device is provided in some embodiments of the present application. The terminal device includes a processor and a memory. The memory is configured to store a computer program capable of running on the processor. The processor is configured to, perform, in response to running the computer program, operations of any of the above-mentioned display methods.

A non-transitory storage medium is further provided in some embodiments of the present application. The storage medium stores a computer program. The computer program, when being executed by a processor, is configured to implement operations of any of the above-mentioned display methods.

In the following, the technical schemes of the present application are further detailed in conjunction with the accompanying drawings of the specification and the specific embodiments.

Figure 2:
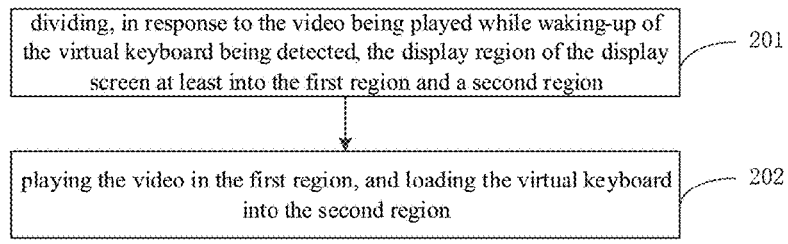
FIG. 2 is a schematic implementing flowchart of a display method according to an embodiment of the present application.

FIG. 2 is a schematic implementing flowchart of the display method according to an embodiment of the present application. The execution subject of the process is a terminal device such as a cell phone or a tablet. The display screen of the terminal device may be a foldable screen. The display method includes operations at blocks illustrated in FIG. 2.

In the operation of 201: dividing, in response to the video being played while waking-up of the virtual keyboard being detected, the display region of the display screen at least into the first region and a second region. The first region and the second region are not overlapped with each other.

The user may play the video through a built-in video playing application (APP) of the terminal device or a built-in browser of the terminal device. While watching the video, the user may wake up the virtual keyboard via a preset input box in a corresponding interactive interface.

During the process of playing the video, the terminal device divides, in response to the waking-up of the virtual keyboard being detected, the display region of the display screen at least into the first region and the second region.

Figure 3:
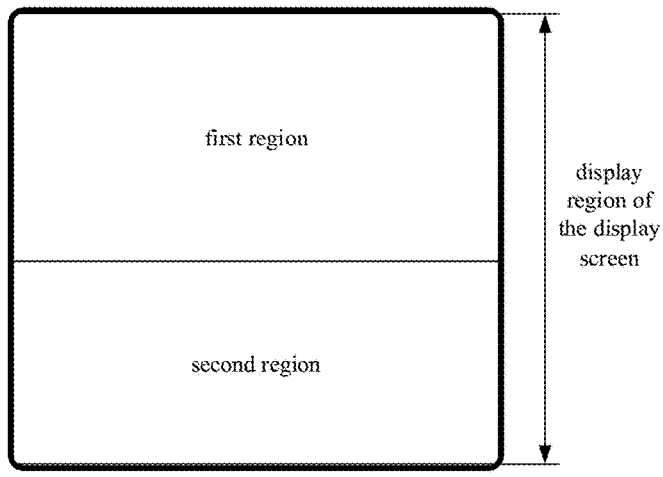
FIG. 3 is a schematic diagram of a display region of a display screen according to an embodiment of the present application.

In an actual application, in a scenario wherein the video is played in a full-screen manner, the display region of the display screen may be divided by the terminal device into the first region and the second region. The second region is located adjacent to and below the first region in the width direction of the display screen. The schematic diagram of the display region of the display screen is as illustrated in FIG. 3. In some embodiments, the display region of the display screen may also be divided by the terminal device into the first region and the second region, and the second region is located adjacent to and at the right side of the first region in the length direction of the display screen. The length direction herein refers to a horizontal direction when the user holds the terminal device by hands, and the width direction herein refers to a vertical direction of the display screen. For example, if the size of the display screen is (1280 pixels)* (768 pixels), when the terminal device is in a landscape display mode, the size of the display screen in the length direction is 1280 pixels, and the size of the display screen in the width direction is 768 pixels. Correspondingly, when the terminal device is in the portrait display mode, the size of the display screen in the length direction is 768 pixels, and the size of the display screen in the width direction is 1280 pixels.

Figure 4:
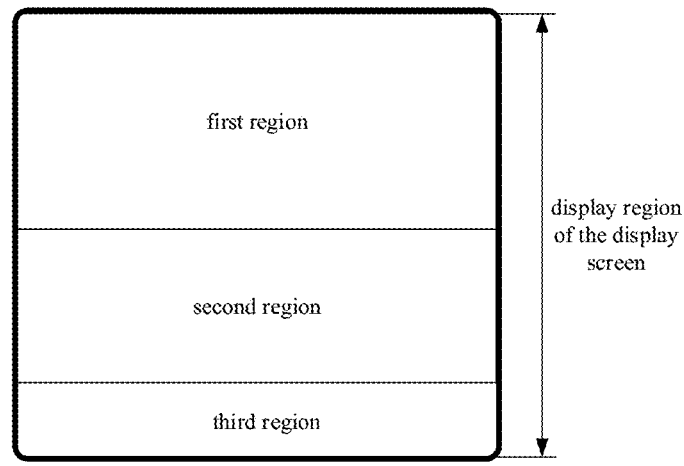
FIG. 4 is a schematic diagram of a display region of a display screen according to another embodiment of the present application.

In a scenario wherein the video is played in a non-full-screen manner, the display region of the display screen may be divided by the terminal device into the first region and the second region. When the size of the display screen of the terminal device is relatively great, for example, when the display screen of the dual-screen foldable terminal device is in the unfolded state, the display region of the display screen is divided into the first region, the second region and the third region as illustrated in FIG. 4. The third region may be configured to display contents other than the video and the virtual keyboard.

As an example, when the display region of the display screen is divided into three regions, the first region is configured to display the video picture, the second region is configured to load the virtual keyboard. The third region is configured to display the bullet chat message corresponding to the displayed video, or to display relevant information of the video playing page. In actual applications, priority is given to ensure displaying of the whole or full played video. When the third region is configured to display the bullet chat message corresponding to the displayed video, the third region is located adjacent to and below the second region. In this way, the bullet chat message and the video picture are displayed separately. The user's watching of the video would be prevented from being disturbed by the bullet chat message floatingly displayed over the video picture.

In some embodiments, the operation of dividing the display region of the display screen at least into the first region and the second region includes: dividing, based on the first aspect ratio of the video and the second aspect ratio of the display screen, the display region at least into the first region and the second region in the first direction. The first direction represents the length direction or the width direction of the display screen.

Herein, the aspect ratio may also be referred as a length-width ratio or a width-height ratio. The aspect ratio is for example 16:9 or 4:3. Considering the fact that, in the actual application, the playing window of the video may adaptively vary with scaling of the video, thus the size of the video is collectively used herein as a reference. The first aspect ratio of the video and the second aspect ratio of the display screen are compared, and a comparison result is obtained. Based on the comparison result, the display region is at least divided into the first region and the second region in the length direction of the display screen; or the display region is at least divided into the first region and the second region in the width direction of the display screen.

In an actual application, when the dual-screen foldable terminal device is in a fully unfolded state, the terminal device divides, in the width direction of the display screen, the display region at least into the first region and the second region. The second region is located adjacent to and below the first region. When the dual-screen foldable terminal device is in a partially unfolded state, and the length of the partially unfolded display screen is much greater than the width of the display screen, for example, the aspect ratio of the partially unfolded display screen is greater than a set threshold, then the terminal device divides, in the length direction of the display screen, the display region at least into the first region and the second region. The second region is located adjacent to and at the right side of the first region.

In order to present the video picture with the largest field of view, in some embodiments, the operation of dividing, based on the first aspect ratio of the video and the second aspect ratio of the display screen, the display region at least into the first region and the second region in the first direction includes: dividing, in response to the first aspect ratio being less than the second aspect ratio, the display region at least into the first region and the second region in the length direction of the display screen; or, dividing, in response to the first aspect ratio being greater than or equal to the second aspect ratio, the display region at least into the first region and the second region in the width direction of the display screen.

For example, when the video is played in the full-screen manner, and when the first width-height ratio is 16:9 and the second width-height ratio is 18:9 or 21:9, at least the first region and the second region are divided out in the length direction of the display screen. In this way, the display region of the display screen is divided into the first region and the second region, and the second region is located adjacent to and at the right side of the first region. When the first width-height ratio is 4:3 and when the second width-height ratio is 1:1, at least the first region and the second region are divided out in the width direction of the display screen. In this way, the display region of the display screen is divided into the first region and the second region, and the second region is located adjacent to and below the first region.

In order to facilitate the user's watching of the video, in some embodiments, the operation of dividing the display region at least into the first region and the second region in the first direction further includes: determining, based on the first size of the virtual keyboard and the second size of the video, the size of the first region in the first direction and the size of the second region in the first direction. The first size represents the corresponding size of the virtual keyboard in the first direction, and the second size represents the corresponding size of the video in the first direction.

Herein, the first size of the virtual keyboard is the size corresponding to the virtual keyboard when it is not scaled or zoomed. The first size of the virtual keyboard is set and stored in a local database. The second aspect ratio of the display screen=(a horizontal resolution×a horizontal pixel length):(a vertical resolution×a vertical pixel length). The sizes referred to in some embodiments of the present application are all measured in pixels. The size of the display screen in the length direction represents the product of a horizontal pixel number and a horizontal pixel length. The size of the display screen in the width direction represents the product of a vertical pixel number and a vertical pixel length. In some embodiments, the size of the display screen in the length direction represents the horizontal pixel number, and the size of the display screen in the width direction represents the vertical pixel number.

In an actual application, when the first direction represents the length direction of the display screen, the terminal device is configured to: determine, based on the first aspect ratio of the video and the second aspect ratio of the display screen, the horizontal resolution of the video; determine, the product of the horizontal resolution of the video and the horizontal pixel length of the video, as a picture length supported by the video; and determine, based on the length of the virtual keyboard and the picture length supported by the video, the length of the first region and the length of the second region. The sum of the length of the first region and the length of the second region is less than or equal to the length of the video playing window. The length of the video playing window is less than or equal to the length of the display screen.

Figure 5:
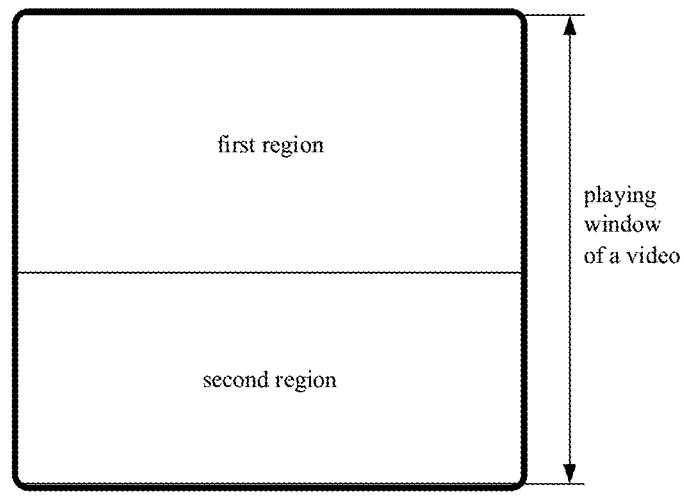
FIG. 5 is a schematic diagram of a playing window of a video provided according to an embodiment of the present application.
Figure 6:
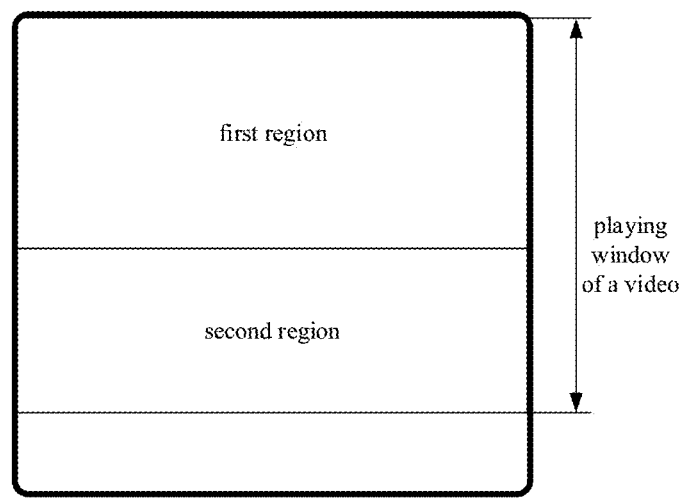
FIG. 6 is a schematic diagram of a playing window of a video provided according to another embodiment of the present application.

When the first direction represents the width direction of the display screen, the terminal device is configured to: determine, based on the first aspect ratio of the video and the second aspect ratio of the display screen, the vertical resolution of the video; determine, the product of the vertical resolution of the video and the vertical pixel length, as the picture width supported by the video; and determine, based on the width of the virtual keyboard and the picture width supported by the video, the width of the first region and the width of the second region. The sum of the width of the first region and the width of the second region is less than or equal to the width of the video playing window. The width of the video playing window is less than or equal to the width of the display screen. As illustrated in FIG. 5, in a scenario wherein the video is played in the full-screen manner, the playing window of the video corresponds to the display region of the display screen. At this point, the width of the playing window of the video is equal to the width of the display region of the display screen. As illustrated in FIG. 6, in a scenario wherein the video is played in the non-full-screen manner, the width of the playing window of the video is less than the width of the display region of the display screen.

In an actual application, in order to be able to successfully load the virtual keyboard into the second region, the size of the second region in the first direction is greater than or equal to the minimum size supported by the virtual keyboard in the first direction.

In order to facilitate the user to watch the video, the size of the second region in the first direction is normally less than or equal to the first size of the virtual keyboard in the first direction, and is greater than or equal to the minimum size supported by the virtual keyboard in the first direction. In this way, more regions may be reserved or left in the playing window of the video for playing the video. Of course, in some embodiments, in order to facilitate a user with a poor view sight to recognize or identify information on the virtual keyboard such as letters and numbers, when the display region of the display screen is relatively large, and if the picture of the video is not scaled down or a scaling-down ratio of the video is less than a set ratio, then the size of the determined second region in the first direction may be greater than the second size of the virtual keyboard in the first direction. In this way, the scaled-up virtual keyboard may be loaded into the second region. In an actual application, the size of the first region in the first direction is greater than the size of the second region in the first direction.

In some embodiments, the operation of determining, based on the first size of the virtual keyboard and the second size of the video, the size of the first region and the size of the second region in the first direction further includes: in response to the first sum being less than or equal to a third size of the display region in the first direction, determining, based on the second size, the size of the first region in the first direction and the size of the second region in the first direction; or in response to the first sum being greater than the third size, determining, the minimum size supported by the virtual keyboard in the first direction, as the size of the second region in the first direction. The first sum represents the sum of the second size and the minimum size supported by the virtual keyboard in the first direction.

Herein, the terminal device is configured to: calculate the sum of the second size of the video in the first direction and the minimum size supported by the virtual keyboard in the first direction, to obtain the first sum; compare the calculated first sum and the third size of the video playing window in the first direction, to obtain the comparison result.

In response to the comparison result representing that the first sum is less than or equal to the third size, it is represented that, the playing window of the video may also display the whole or full video picture and the virtual keyboard without scaling-down the video picture or the virtual keyboard. At this point, the terminal device determines, based on the second size of the video, the size of the first region in the first direction and the size of the second region in the first direction.

In an actual application, in order to facilitate the user to watch the video, the size of the first region in the first direction is greater than the second size of the video in the first direction, and the size of the second region in the first direction is equal to the size of the virtual keyboard in the first direction. In this way, the video whose picture has been scaled up may be played in the first region. In order to facilitate the user to use the virtual keyboard, the size of the first region in the first direction is greater than the second size of the video in the first direction, and the size of the second region in the first direction is greater than the size of the virtual keyboard in the first direction, thus the scaled-up virtual keyboard may be loaded into the second region.

In response to the size of the first region in the first direction being greater than the second size of the video in the first direction, the first region is configured for performance of full-size playing of the video by the terminal device. In some embodiments, the first region is configured for playing of the video by the terminal device according to the second size of the video in the first direction, and an extra region in the first region is set to black. The sum of the size of the extra region that has been set to black in the first direction and the size of the video in the first direction is equal to the size of the first region in the first direction. In an actual application, a top portion and a bottom portion that are adjacent to the video picture are set to black, or the left side and the right side that are adjacent to the video picture are set to black.

In response to the comparison result representing that the first sum is greater than the third size, it is represented that, the playing window of the video is incapable of displaying the full video picture and the virtual keyboard without scaling down the video picture or the virtual keyboard. At this point, the minimum size supported by the virtual keyboard in the first direction is determined as the size of the second region in the first direction. Therefore, the virtual keyboard is loaded into the second region based on the minimum size supported by the virtual keyboard.

In the operation of 202: playing the video in the first region, and loading the virtual keyboard into the second region.

Figure 7:
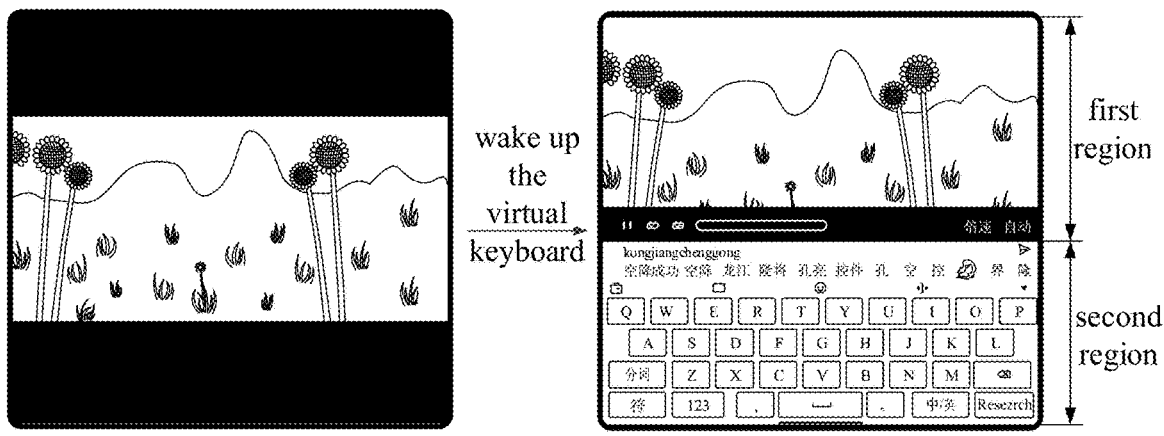
FIG. 7 is a schematic diagram illustrating variation of the interface during a video playing process provided according to an embodiment of the present application.
Figure 8:
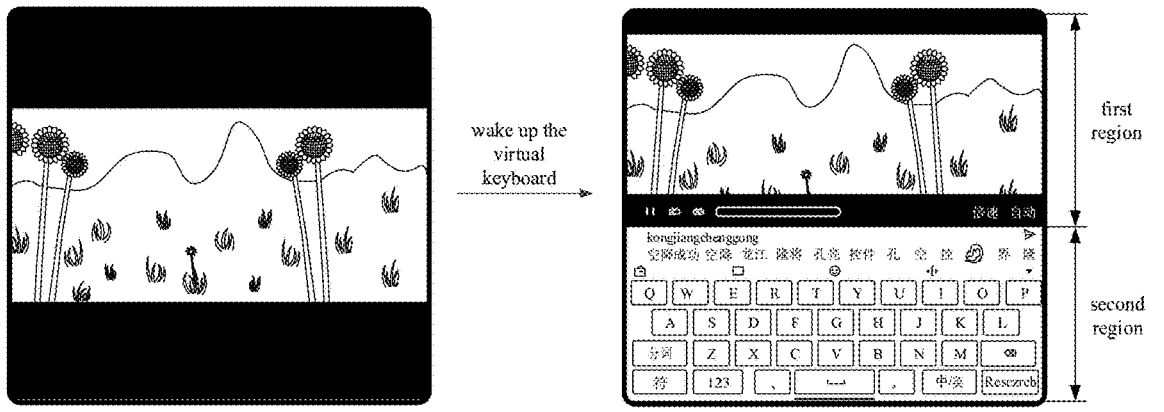
FIG. 8 is a schematic diagram illustrating the variation of the interface during the video playing process provided according to an embodiment of the present application.

Herein, the terminal device is configured to: play the video in the first region of the display screen, and load the virtual keyboard into the second region. Therefore, the user may input the bullet chat message corresponding to the played video via the virtual keyboard. When the first direction is the width direction of the display screen, the variation of the interface during the video playing process of the terminal device is as illustrated in FIG. 7 or FIG. 8. As illustrated in FIG. 7, the bullet chat message corresponding to the played video is floatingly displayed on the image of the first region. As illustrated in FIG. 8, the bullet chat message corresponding to the played video may be displayed on the set-to-black region of the first region. In some embodiments, the bullet chat message corresponding to the played video may be simultaneously displayed in the set-to-black region and the video picture of the first region.

In an actual application, the terminal device may be configured to: play, based on the size of the first region in the first direction and the second size of the video in the first direction, the video in the first region; load, based on the size of the second region in the first direction, the first size of the virtual keyboard in the first direction and the minimum size supported by the virtual keyboard in the first direction, the virtual keyboard into the second region. In response to the size of the first region in the first direction being less than the size of the video in the first direction, the terminal device is configured to: scale down the picture of the displayed video, and display the scaled-down video picture in the first region. In response to the size of the first region in the first direction being equal to the size of the video in the first direction, the terminal device does not perform scaling of the displayed video. In response to the size of the first region in the first direction being greater than the size of the video in the first direction, the terminal device is configured to: perform scaling-up of the picture of the displayed video, and display the scaled-up video picture in the first region.

In response to the size of the second region in the first direction being equal to the minimum size supported by the virtual keyboard in the first direction, the loading of the virtual keyboard is performed in the second region based on the minimum size supported by the virtual keyboard. In other words, the size of the virtual keyboard displayed in the second region is equal to the minimum size supported by the virtual keyboard. In response to the size of the second region in the first direction being greater than the minimum size supported by the virtual keyboard in the first direction, and being less than the first size of the virtual keyboard in the first direction, the virtual keyboard is scaled down based on the size of the second region in the first direction, and the scaled-down virtual keyboard is loaded into the second region. The size of the scaled-down virtual keyboard in the first direction is greater than the minimum height supported by the virtual keyboard in the first direction. In response to the size of the second region in the first direction being equal to the first size of the virtual keyboard in the first direction, the virtual keyboard is not scaled down.

In an application scenario, in response to the first sum being less than or equal to the third size, and the size of the first region in the first direction being greater than the second size of the video in the first direction, the terminal device may be configured to: scale up, based on the size of the first region in the first direction and the first width-height ratio of the video, the picture of the video; play the video whose picture has been scaled up in the first region, so as to play the video in the first region in full size. The terminal device may also be configured to: play, based on the second size of the video in the first direction, the video in the first region, and set the extra region in the first region to be black. At this point, the sum of the size of the video picture in the first direction and the size of the set-to-black region in the first direction is equal to the size of the first region in the first direction. The terminal device is configured to: load, based on the first size of the virtual keyboard in the first direction, or based on the minimum size supported by the virtual keyboard in the first direction, the virtual keyboard into the second region.

Figure 9:
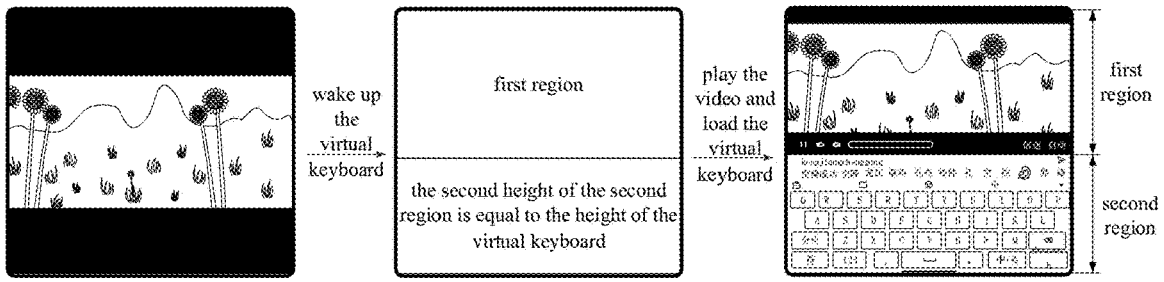
FIG. 9 is a schematic diagram illustrating the variation of the interface during a video playing process provided according to another embodiment of the present application.
Figure 10:
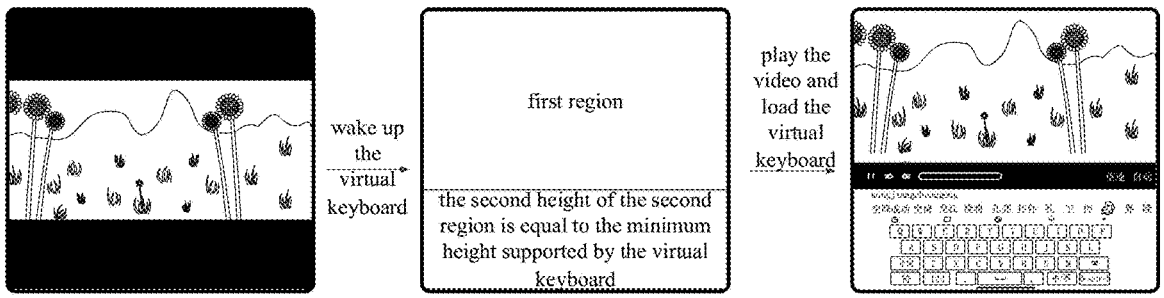
FIG. 10 is a schematic diagram illustrating the variation of the interface during a video playing process provided according to yet another embodiment of the present application.

In an actual application, FIG. 9 illustrates a schematic diagram illustrating the variation of the interface during the video playing process provided according to another embodiment of the present application. When the first direction is the width direction of the display screen, the terminal device is configured to: play, based on the picture width of the video, the video in the first region, and set the top portion and the bottom portion that are adjacent to the video picture to be black. The terminal device is configured to: load, based on the width of the virtual keyboard, the virtual keyboard into the second region. At this point, the picture width in the first region is equal to the picture width of the video, and is less than the width of the first region. The width of the virtual keyboard displayed in the second region is equal to the width of the virtual keyboard. FIG. 10 illustrates a schematic diagram illustrating the variation of the interface during the video playing process provided according to yet another embodiment of the present application. When the first direction is the width direction of the display screen, the terminal device is configured to: play the video in the first region in full size. The terminal device is configured to: load, based on the minimum width supported by the virtual keyboard, the virtual keyboard in the second region. At this point, the picture width in the first region is greater than the picture width of the video, and the width of the virtual keyboard displayed in the second region is equal to the minimum width supported by the virtual keyboard.

In an application scenario, in response to the first sum being less than or equal to the third size, and the size of the first region in the first direction being equal to the second size of the video in the first direction, the terminal device is configured to: play, based on the second size of the video in the first direction, the video in the first region; scale up, based on the size of the second region in the first direction, the virtual keyboard; and load the scaled-up virtual keyboard in the second region.

In some embodiments, in response to the first sum being greater than the third size, the operation of playing the video in the first region includes: in response to scaling of the picture of the video, playing the video in the first region.

Herein, it is considered that, in response to the first sum being greater than the third size, the size of the second region in the first direction being equal to the minimum size supported by the virtual keyboard in the first direction, the size of the first region in the first direction is equal to a difference value between the third size and the minimum size supported by the virtual keyboard in the first direction. The terminal device is configured to: load, based on the minimum size supported by the virtual keyboard in the first direction, the virtual keyboard into the second region; scale, based on the size of the first region in the first direction, the picture of the video; and play the video whose picture has been scaled in the first region.

In an application scenario, in response to the first sum being greater than the third size, and the size of the second region in the first direction being equal to the minimum size supported by the virtual keyboard in the first direction, the size in the first direction of the virtual keyboard displayed in the second region by the terminal device is equal to the minimum size supported by the virtual keyboard. In response to the size of the first region in the first direction being equal to the second size of the video in the first direction, playing, based on the second size of the video in the first direction, the video in the first region. In response to the size of the first region in the first direction being greater than the second size of the video in the first direction, the terminal device is configured to: after scaling up the picture of the video based on the size of the first region in the first direction, play the video in the first region. In response to the size of the first region in the first direction being less than the second size of the video in the first direction, the terminal device is configured to: after scaling down the picture of the video based on the size of the first region in the first direction, play the video in the first region.

Figure 11:
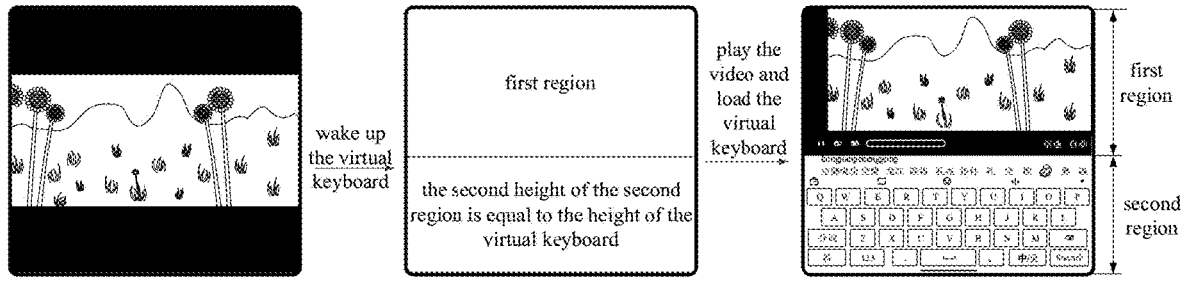
FIG. 11 is a schematic diagram illustrating the variation of the interface during a video playing process provided according to yet another embodiment of the present application.

In an actual application, FIG. 11 illustrates a schematic diagram illustrating the variation of the interface during the video playing process provided according to yet another embodiment of the present application. When the first direction is the width direction of the display screen, the terminal device is configured to: play the video whose picture has been scaled down in the first region; load, based on the minimum width supported by the virtual keyboard, the virtual keyboard into the second region.

It should be appreciated that, the terminal device is configured to: display the full video picture in the first region. When there is a bullet chat message corresponding to the played video, the terminal device is further configured to: display the bullet chat message corresponding to the played video in the first region.

In order to facilitate the user to watch the video and to use the virtual keyboard, the operation of playing the video in the first region, and loading the virtual keyboard into the second region further includes: centering and playing the video in the first region; and/or, loading the virtual keyboard into the second region and centering the virtual keyboard in the second region.

Herein, by centering and playing the video in the first region, the user may be facilitated to watch the video, and by loading and centering the virtual keyboard in the second region, the user may be facilitated to operate the virtual keyboard by his/her two hands.

In some embodiments, the method may further include: receiving the bullet chat message relating to the video. The bullet chat message is input via the loaded virtual keyboard.

Herein, the terminal device may receive the bullet chat message relating to the video and input by the user via the virtual keyboard. When it is detected that, the user has triggered a send command, the terminal device would send the bullet chat message that has been input via the virtual keyboard to a server corresponding to the video. In this way, the server, in response to the reception of the bullet chat message that is sent from the terminal device, may broadcast the received bullet chat message. Therefore, a user that is watching the video is capable of viewing the corresponding bullet chat message. During the process of inputting the bullet chat message, the user may watch the full video picture.

During the process of inputting the bullet chat message via the virtual keyboard by the user, the terminal device displays the bullet chat message that has not been sent in the second region.

In some embodiments of the present disclosure, in response to the video being played while waking-up of the virtual keyboard being detected, the display region of the display screen is divided at least into the first region and the second region, the first region and the second region are not overlapped with each other; the video is played in the first region, and the virtual keyboard is loaded into the second region. In this way, the virtual keyboard is loaded into a region different from that of the video, and is not superimposed and displayed above the video picture. The user may watch the full video picture in the first region. During the process in which the user inputs the bullet chat message via the virtual keyboard, the bullet chat message is corresponding to the displayed video and the virtual keyboard has been loaded into the second region, thus the virtual keyboard won't occlude the picture of the displayed video. The user's watching of the video would not be disturbed.

Figure 12:
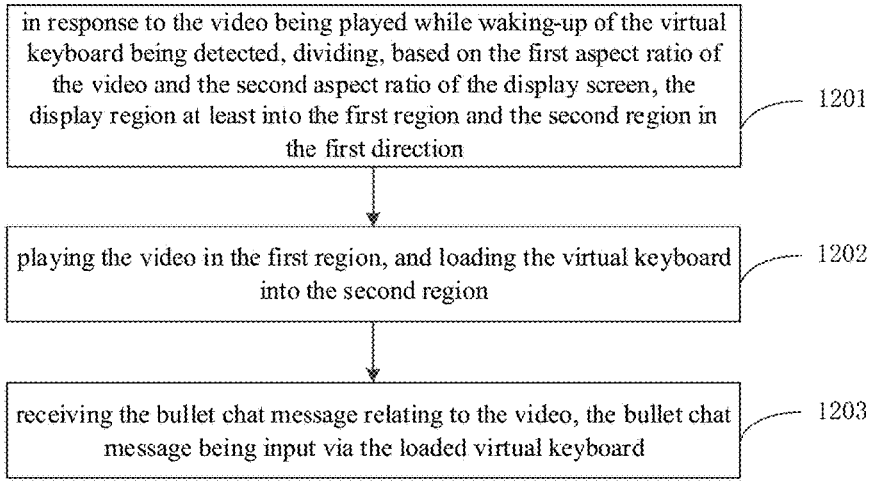
FIG. 12 is a schematic flowchart of the display method according to another embodiment of the present application.

As illustrated in FIG. 12, FIG. 12 is a schematic flowchart of the display method according to some application embodiments of the present application. The display method includes the operations illustrated at blocks illustrated in FIG. 12.

In the operation of 1201: in response to the video being played while waking-up of the virtual keyboard being detected, based on the height of the virtual keyboard and the vertical video resolution of the video, dividing, based on the first aspect ratio of the video and the second aspect ratio of the display screen, the display region at least into the first region and the second region in the first direction. The first direction represents the length direction or the width direction of the display screen. The first region and the second region are not overlapped with each other.

It is considered that, in an application scenario with the portrait display mode and the non-full-screen displaying manner, when the virtual keyboard of the terminal device is waked up, a situation in which the virtual keyboard overlaps with the video picture would not be caused. Therefore, the present embodiment mainly relates to the application scenario in which the video is played in the landscape display mode, and to the application scenario in which the video is displayed in the full-screen mode.

Herein, the terminal device is configured to: in response to the video being played while waking-up of the virtual keyboard being detected, detecting a current display mode and a current playing mode. The display mode includes the landscape display mode and the portrait display mode. The playing mode includes the full-screen playing mode and the non-full-screen playing mode.

In response to the current display mode being the landscape display mode, or in response to the current playing mode being the full-screen playing mode, based on the first aspect ratio of the video and the second aspect ratio of the display screen, dividing the display region at least into the first region and the second region in the first direction. The specific implementations may be referred to the above-mentioned related descriptions, which would not be repeated herein.

In the operation of 1202: playing the video in the first region, and loading the virtual keyboard into the second region.

Herein, the terminal device is configured to: center and play the video in the first region, load the virtual keyboard into the second region and center the virtual keyboard in the second region.

In the operation of 1203: receiving the bullet chat message relating to the video. The bullet chat message is input via the loaded virtual keyboard.

Figure 13:
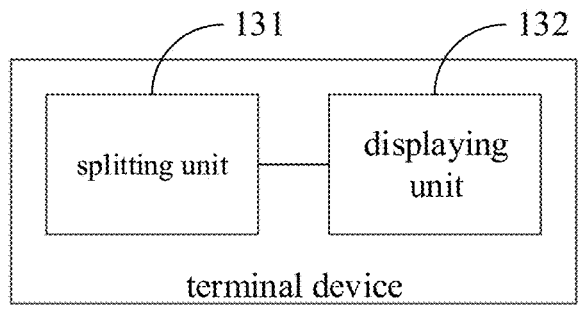
FIG. 13 is a schematic structural diagram of a terminal device provided according to an embodiment of the present disclosure.

In order to implement the method of the embodiments of the present application, a terminal device is further provided in the present embodiment. As illustrated in FIG. 13, the terminal device includes a splitting unit 131 and a displaying unit 132.

The splitting unit 131 is configured to: divide, in response to the video being played while waking-up of the virtual keyboard being detected, the display region of the display screen at least into the first region and the second region. The first region and the second region are not overlapped with each other.

The displaying unit 132 is configured to: play the video in the first region, and load the virtual keyboard into the second region.

In some embodiments, the splitting unit 131 is configured to: divide, based on the first aspect ratio of the video and the second aspect ratio of the display screen, the display region at least into the first region and the second region in the first direction. The first direction represents the length direction or the width direction of the display screen.

In some embodiments, the splitting unit 131 is configured to: divide, in response to the first aspect ratio being less than the second aspect ratio, the display region at least into the first region and the second region in the length direction of the display screen; or divide, in response to the first aspect ratio being greater than or equal to the second aspect ratio, the display region at least into the first region and the second region in the width direction of the display screen.

In some embodiments, the terminal device further includes a determining unit. The determining unit is configured to: determine, based on the first size of the virtual keyboard and the second size of the video, the size of the first region and the size of the second region in the first direction. The first size represents the corresponding size of the virtual keyboard in the first direction, and the second size represents the corresponding size of the video in the first direction.

In some embodiments, the determining unit is configured to: in response to the first sum being less than or equal to the third size of the display region in the first direction, determine, based on the second size, the size of the first region in the first direction and the size of the second region in the first direction; or in response to the first sum being greater than the third size, determine, the minimum size supported by the virtual keyboard in the first direction, as the size of the second region in the first direction. The first sum represents the sum of the second size and the minimum size supported by the virtual keyboard in the first direction.

In some embodiments, in response to the first sum being greater than the third size, the displaying unit 132 is configured to: in response to scaling of the picture of the video, play the video in the first region.

In some embodiments, the terminal device further includes a receiving unit. The receiving unit is configured to: receive a bullet chat message relating to the video. The bullet chat is input via the loaded virtual keyboard.

In some embodiments, the splitting unit 131 is configured to: in response to the display screen meeting a set condition, divide the display region of the display screen into the first region, the second region and the third region. The first region, the second region and the third region are not overlapped with each other. The third region is configured to display contents other than the video and the virtual keyboard.

In some embodiments, the set condition includes: the display screen of the dual-screen foldable terminal device being in the unfolded state.

In some embodiments, the third region is configured to display the bullet chat message corresponding to the video.

In an actual application, the splitting unit 131 and the displaying unit 132 may be implemented by the processor in the terminal device. The processor may be a central processing unit (CPU), a digital signal processor (DSP), a Microcontroller Unit (MCU) or a Field-Programmable Gate Array (FPGA) etc. The receiving unit may be cooperatively implemented by the processor and a communication interface. The processor needs to run a program stored in a memory to achieve the function of each of the above-mentioned program modules.

When the terminal device provided in the above-mentioned embodiment is playing the video, the division manner of each of the above-mentioned program modules is only taken as an example for illustration. In an actual application, the above-mentioned processing may be assigned to be implemented by different program modules according to the needs. In other words, the internal structure of the apparatus may be divided into different program modules, so as to complete the above-described processing in whole or in part. In addition, the terminal device provided by the above-mentioned embodiment belongs to a same concept as that of the display method embodiments. The specific implementing process of the terminal device is detailed in the method embodiments, which will not be repeated herein.

Figure 14:
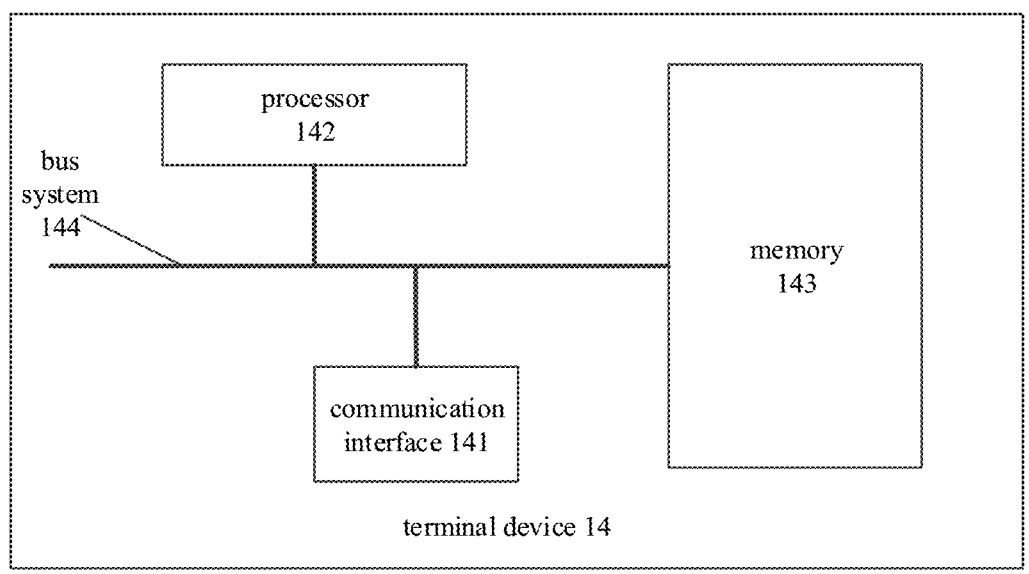
FIG. 14 is a schematic structural diagram of a terminal device provided according to another embodiment of the present application.

Based on the above-mentioned hardware implementation of the program module, and in order to implement the method of the embodiments of the present application, a terminal device is further provided in the present embodiment. FIG. 14 is a schematic structural diagram illustrating the hardware composition of the terminal device according to some embodiments of the present application. As illustrated in FIG. 14, the terminal device 14 includes a communication interface 141 and a processor 142. The communication interface 141 is configured to enable information interaction with other devices, such as a network device. The processor 142 is configured to be connected to the communication interface 141, thereby enabling the processor 142 to interact information with other devices. When the processor 142 is configured to run the computer program, the method provided at the above-mentioned terminal device side according to one or more technical scheme is implemented. The computer program is stored in the memory 143.

In an actual application, all components of the terminal device 14 are coupled together through the bus system 144. It should be appreciated that, the bus system 144 is configured to implement connection and communication between these components. In addition to the data bus, the bus system 144 may further include a power bus, a control bus and a status signal bus. However, for the sake of clarity, all kinds of buses are denoted in FIG. 14 as the bus system 144.

The memory 143 according to some embodiments of the present application is configured to store various types of data, to support operation of the terminal device 14. Examples of such data may include any computer program configured to be operated on the terminal device 14.

The memory 143 may be a volatile memory or a non-volatile memory. The memory 143 may include both the volatile memory and the non-volatile memory. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be magnetic disk memory or magnetic tape memory. The volatile memory may be a random access memory (RAM), and is used as an external high-speed cache. By way of an exemplary but not a limiting illustration, many types of RAMs are available. The RAM may be a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a SyncLink dynamic random access memory (SLDRAM) and a direct Rambus random access memory (DRRAM). The memory 143 described in embodiments of the present application is intended to include, but is not limited to, these and any other suitable types of memories.

The method disclosed in the above-mentioned embodiments of the present application may be performed or implemented by the processor 1422. The processor 142 may be an integrated circuit chip with signal processing capability. During implementation, the steps of the above-mentioned method may be accomplished by an integrated logic circuitry in hardware-form or instructions in software-form in the processor 142. The above-mentioned processor 142 may be a general purpose processor, a DSP, or another programmable logic device, a discrete gate or a transistor logic device, a discrete hardware component, or the like. The processor 142 may implement or perform the various methods, steps, and logic block diagrams disclosed in the embodiments of the present application. The general purpose processor may be a micro-processor or any conventional processor, etc. The steps of methods disclosed in conjunction with the embodiments of the present disclosure may be performed directly by the hardware decoding processor, or by a combination of hardware and software modules in the decoding processor. The software module may be arranged in the non-transitory storage medium. The storage medium may be arranged in the memory 143. The processor 142 may read the program in the memory 143, and complete the operations of the method in conjunction with the hardware of the processor 142.

In some embodiments, when executing the program, the processor 142 may implement the corresponding process implemented by the terminal device in each method of the embodiments of the present application. For the sake of brevity, the details are not repeated here.

In some exemplary embodiments the present application, a non-transitory storage medium is further provided. The storage medium is a computer storage medium, specifically a computer-readable storage medium, which for example includes the memory 143 configured to store the computer program. The computer program may be executable by the processor 141 of the terminal device, so as to implement the operations described in the above-mentioned methods. The computer-readable storage medium may be a memory such as a FRAM, a ROM, a PROM, an EPROM, an EEPROM, a Flash Memory, a magnetic surface memory, an optical disk, or a CD-ROM.

In the embodiments provided in the present disclosure, it should be appreciated that, the disclosed device and method may be embodied in other ways. The device embodiments described above are merely illustrative. For example, the division of units is only a logical function division, and there may be other division manners in actual implementations. For example, multiple units or components may be combined or integrated into another system, or some features may be ignored or not implemented. In addition, the couplings, direct couplings or communication connections between the components illustrated or discussed may be indirect couplings or communication connections through some interfaces, devices or units, and may be electrical, mechanical or of other forms.

The units described above as separate components may or may not be physically separate. The component displayed as a unit may or may not be a physical unit. That is, it may be located in one place or distributed in multiple network units. Some or all of the units may be selected according to actual requirements, to achieve the object of the solution of the present embodiment.

In addition, the functional units in the embodiments of the present disclosure may all be integrated into a processing module, or each unit may be individually used as a unit, or two or more units may be integrated into one unit. The above-mentioned integrated units may be realized in the form of hardware, or in the form of hardware plus software functional units.

Those of ordinary skills in the art can understand that, all or a part of the operations of the above method embodiments may be implemented by a hardware relating to a program instruction. The above-mentioned program may be stored in a computer readable storage medium. When being executed, the program may execute the operations of the above-mentioned method embodiments. The afore-mentioned storage medium includes: various mediums such as a removable storage devices, a read-only memory (ROM), a random access memory (RAM), a magnetic disk, or a CD-ROM that is capable of storing program codes.

The technical solutions described in embodiments of the present disclosure may be combined arbitrarily without causing confliction.

The above are only specific implementations of the present disclosure, and the protection scope of the present disclosure is not limited thereto. Changes or alternations within the technical scope of the present disclosure could easily occur to those skilled in the art and should be considered to be in the protection scope of the present disclosure. Therefore, the protection scope of the present disclosure should be subject to the appended claims.

What is claimed is:

1. A display method, comprising:
dividing, in response to a video being played while waking-up of a virtual keyboard being detected, a display region of a display screen at least into a first region and a second region, the first region and the second region being not overlapped with each other; and
playing the video in the first region, and loading the virtual keyboard into the second region,
wherein the operation of dividing the display region of the display screen at least into the first region and the second region comprises:
dividing, based on a first aspect ratio of the video and a second aspect ratio of the display screen, the display region at least into the first region and the second region in a first direction,
wherein, the first direction represents a length direction or a width direction of the display screen,
wherein in response to the operation of dividing the display region at least into the first region and the second region in the first direction, the method further comprises:
determining, based on a first size of the virtual keyboard and a second size of the video, a size of the first region and a size of the second region in the first direction,
wherein, the first size represents a corresponding size of the virtual keyboard in the first direction, and the second size represents a corresponding size of the video in the first direction.

2. The method as claimed in claim 1, wherein
the operation of dividing, based on the first aspect ratio of the video and the second aspect ratio of the display screen, the display region at least into the first region and the second region in the first direction comprises:
dividing, in response to the first aspect ratio being less than the second aspect ratio, the display region at least into the first region and the second region in the length direction of the display screen; or
dividing, in response to the first aspect ratio being greater than or equal to the second aspect ratio, the display region at least into the first region and the second region in the width direction of the display screen.

3. The method as claimed in claim 1, wherein
in response to the operation of determining, based on the first size of the virtual keyboard and the second size of the video, the size of the first region and the size of the second region in the first direction, the method further comprises:
determining, in response to a first sum being less than or equal to a third size of the display region in the first direction, based on the second size, the size of the first region in the first direction and the size of the second region in the first direction; or
determining, in response to the first sum being greater than the third size, a minimum size supported by the virtual keyboard in the first direction, as the size of the second region in the first direction,
wherein, the first sum represents a sum of the second size and the minimum size supported by the virtual keyboard in the first direction.

4. The method as claimed in claim 3, wherein
in response to the first sum being greater than the third size, the operation of playing the video in the first region comprises:
playing, in response to scaling of a picture of the video, the video in the first region.

5. The method as claimed in claim 1, wherein
the method further comprises:
receiving a bullet chat message relating to the video, the bullet chat message being input via the loaded virtual keyboard.

6. The method as claimed in claim 1, wherein
the operation of dividing the display region of the display screen at least into the first region and the second region comprises:
in response to the display screen meeting a set condition, dividing the display region of the display screen into the first region, the second region and a third region, the first region, the second region and the third region being not overlapped with each other,
wherein, the third region is configured to display contents other than the video and the virtual keyboard.

7. The method as claimed in claim 6, wherein
the set condition comprises: the display screen of the dual-screen foldable terminal device being in an unfolded state.

8. The method as claimed in claim 6, wherein
the third region is configured to display a bullet chat message corresponding to the video.

9. A terminal device, comprising a processor and a memory, wherein
the memory is configured to store a computer program capable of running on the processor,
the processor is configured to, in response to running the computer program, perform operations of a display method comprising:
dividing, in response to a video being played while waking-up of a virtual keyboard being detected, a display region of a display screen at least into a first region and a second region, the first region and the second region being not overlapped with each other; and
playing the video in the first region, and loading the virtual keyboard into the second region,
wherein the operation of dividing the display region of the display screen at least into the first region and the second region comprises:
dividing, based on a first aspect ratio of the video and a second aspect ratio of the display screen, the display region at least into the first region and the second region in a first direction,
wherein, the first direction represents a length direction or a width direction of the display screen,
wherein in response to the operation of dividing the display region at least into the first region and the second region in the first direction, the method further comprises:
determining, based on a first size of the virtual keyboard and a second size of the video, a size of the first region and a size of the second region in the first direction,
wherein, the first size represents a corresponding size of the virtual keyboard in the first direction, and the second size represents a corresponding size of the video in the first direction.

10. The terminal device as claimed in claim 9, wherein the operation of dividing, based on the first aspect ratio of the video and the second aspect ratio of the display screen, the display region at least into the first region and the second region in the first direction comprises:

dividing, in response to the first aspect ratio being less than the second aspect ratio, the display region at least into the first region and the second region in the length direction of the display screen; or dividing, in response to the first aspect ratio being greater than or equal to the second aspect ratio, the display region at least into the first region and the second region in the width direction of the display screen.

11. The terminal device as claimed in claim 9, wherein in response to the operation of determining, based on the first size of the virtual keyboard and the second size of the video, the size of the first region and the size of the second region in the first direction, the method further comprises:

determining, in response to a first sum being less than or equal to a third size of the display region in the first direction, based on the second size, the size of the first region in the first direction and the size of the second region in the first direction; or determining, in response to the first sum being greater than the third size, a minimum size supported by the virtual keyboard in the first direction, as the size of the second region in the first direction, wherein, the first sum represents a sum of the second size and the minimum size supported by the virtual keyboard in the first direction.

12. The terminal device as claimed in claim 11, wherein in response to the first sum being greater than the third size, the operation of playing the video in the first region comprises:

playing, in response to scaling of a picture of the video, the video in the first region.

13. The terminal device as claimed in claim 9, wherein the method further comprises:

receiving a bullet chat message relating to the video, the bullet chat message being input via the loaded virtual keyboard.

14. The terminal device as claimed in claim 9, wherein the operation of dividing the display region of the display screen at least into the first region and the second region comprises:

in response to the display screen meeting a set condition, dividing the display region of the display screen into the first region, the second region and a third region, the first region, the second region and the third region being not overlapped with each other, wherein, the third region is configured to display contents other than the video and the virtual keyboard.

15. The terminal device as claimed in claim 14, wherein the set condition comprises: the display screen of the dual-screen foldable terminal device being in an unfolded state.

16. A non-transitory storage medium storing a computer program, wherein the computer program, when being executed by a processor, is configured to implement operations of a display method comprising:

dividing, in response to a video being played while waking-up of a virtual keyboard being detected, a display region of a display screen at least into a first region and a second region, the first region and the second region being not overlapped with each other; and playing the video in the first region, and loading the virtual keyboard into the second region, wherein the operation of dividing the display region of the display screen at least into the first region and the second region comprises:

dividing, based on a first aspect ratio of the video and a second aspect ratio of the display screen, the display region at least into the first region and the second region in a first direction, wherein, the first direction represents a length direction or a width direction of the display screen, wherein in response to the operation of dividing the display region at least into the first region and the second region in the first direction, the method further comprises:

determining, based on a first size of the virtual keyboard and a second size of the video, a size of the first region and a size of the second region in the first direction, wherein, the first size represents a corresponding size of the virtual keyboard in the first direction, and the second size represents a corresponding size of the video in the first direction.

* * * * *